(12) United States Patent
Taglang

(10) Patent No.: US 6,397,727 B2
(45) Date of Patent: Jun. 4, 2002

(54) ACTUATOR FOR PIVOT CHUCK

(75) Inventor: Johann Taglang, Medlingen (DE)

(73) Assignee: Rohm GmbH, Sontheim (DE)

( * ) Notice: Subject to any disclaimer, the term of this patent is extended or adjusted under 35 U.S.C. 154(b) by 3 days.

(21) Appl. No.: 09/766,828

(22) Filed: Jan. 18, 2001

(30) Foreign Application Priority Data

Jan. 19, 2000 (DE) ..................... 200 00 845 U

(51) Int. Cl.$^7$ ............................................. F01B 21/00
(52) U.S. Cl. ................................................. 92/2; 91/61
(58) Field of Search ......................... 92/2, 31, 33, 65, 92/66, 68, 143; 91/61; 74/573 R, 574; 279/4.01

(56) References Cited

U.S. PATENT DOCUMENTS 4,747,609 A     5/1988  Scharfen .................... 279/4
5,367,943 A  *  11/1994 Stoll et al. ................... 92/2

FOREIGN PATENT DOCUMENTS

DE   32 15 899    11/1983
DE   32 30 135     2/1984

* cited by examiner

Primary Examiner—Edward K. Look
Assistant Examiner—Thomas E. Lazo
(74) Attorney, Agent, or Firm—Herbert Dubno; Andrews Wilford

(57) ABSTRACT

A pivot-chuck actuator has a housing extending along an axis, a piston chamber centered on the axis, and a vane chamber offset and separate from the piston chamber. A piston is axially displaceable in the piston chamber and axially fixed to a shaft extending from the housing on the axis. A vane element on the shaft angularly subdivides the vane chamber into a pair of angularly offset compartments and formations rotationally couple the vane element to the shaft for joint rotation therewith while permitting relatively axial movement of the vane element and shaft. The compartments can be alternately pressurized to rotate the vane element and shaft about the axis. A pair of counterweights angularly fixed on the shaft axially flank the vane element to allow the actuator to operate at very high speeds.

11 Claims, 6 Drawing Sheets

ACTUATOR FOR PIVOT CHUCK

FIELD OF THE INVENTION

The present invention relates to a chuck actuator. More particularly this invention concerns such an actuator for a pivot chuck where the actuating member must be able to move along its rotation axis to open and close the chuck and rotate about its axis to pivotally switch the chuck jaws.

BACKGROUND OF THE INVENTION

A standard pivot chuck such as described in German patent document 3,215,899 of Kimm, German patent 3,230, 135 of Muller, and U.S. Pat. No. 4,747,609 of Scharfen has a jaw assembly that is tightened and closed by axial movement of an actuating member, typically a rod that extends along the chuck rotation axis from an actuator housing to which a chuck body carrying the jaws is fixed. This actuating rod is advanced to open or spread the jaws and retracted to close them together. The jaws are in turn mounted on an intermediate part that can be pivoted about an axis transverse to the chuck pivot axis to reposition the work-piece so that, once the work-piece is secured in the chuck, it can be machined from opposite ends or in different positions.

The pivoting action is typically controlled by rotation of the actuating rod about its axis, allowing this part to serve a second function. To this end the actuating rod carries in the chuck member a main piston centered on the chuck axis and movable axially in a cylinder for opening and closing the chuck, and a radially projecting vane element angularly subdividing another chamber into a pair of compartments alternately pressurizable to rotate the actuating rod.

The angular position of the vane thus can change so that it presents an eccentric mass whose position similarly changes depending on chuck setting. Attempts to counterbalance this eccentric mass have been only marginally effective. Chuck rotation speeds are therefore limited to at most 2000 rev/min which is often not fast enough for some high-speed machining operations.

OBJECTS OF THE INVENTION

It is therefore an object of the present invention to provide an improved pivot-chuck actuator.

Another object is the provision of such an improved pivot-chuck actuator which overcomes the above-given disadvantages, that is which can be operated at very high rotation speeds.

SUMMARY OF THE INVENTION

A pivot-chuck actuator has according to the invention a housing extending along an axis and formed centered on the axis with a piston chamber and with a vane chamber offset and separate from the piston chamber. A piston axially displaceable in the piston chamber is axially fixed to a shaft extending from the housing on the axis. A vane element on the shaft angularly subdivides the vane chamber into a pair of angularly offset compartments and formations rotationally couple the vane element to the shaft for joint rotation therewith while permitting relatively axial movement of the vane element and shaft. The compartments cam be alternately pressurized to rotate the vane element and shaft about the axis. A pair of counterweights angularly fixed on the shaft axially flank the vane element.

Using two counterweights axially flanking the vane element allows its weight to be very effectively counterbalanced so as to meet DIN ISO 1940 for G=6.3 or more. The actuator can spin at 4000 rev/min without difficulty.

According to the invention formations rotationally couple the counterweights to the shaft for joint rotation therewith while permitting relative axial movement of the counterweights and shaft. The housing is further formed with respective counterweight chambers axially flanking the vane chamber and receiving the counterweights. These chambers are filled with oil and the counterweights are formed with angularly throughgoing passages. Thus the counterweights damp rotation of the shaft. Furthermore the axial positions of the counterweights and vane element remain fixed, even if the shaft moves axially, to main-tain perfect counterbalance.

Each of the counterweights according to the invention is formed, line the vale element, as a rectangular arm projecting radially from an annular hub the shaft and having a rounded outer end. Furthermore the counterweights are of identical shape and mass, normally made of the same metal. In fact each counter-weight can, seen axially, be of a shape identical to that of the vane element but can have an axial length equal to half that of the vane element. The formations rotationally coupling the counterweights to the shaft are respective pins set in the shaft and axially extending grooves receiving the pins and formed in the counterweights.

The counterweights in accordance with the invention project 180° offset from the vane element. The housing is formed by a plurality of axially stacked plates. Furthermore the housing is formed with a tubular stem coaxially surrounding the shaft. The pressurizer includes a distributor rotatable on the stem and passages formed in the stem.

BRIEF DESCRIPTION OF THE DRAWING

The above and other objects, features, and advantages will become more readily apparent from the following description, reference being made to the accompanying drawing in which:

FIG. 4 is a cross section taken along line IV—IV of FIG. 1a; and

SPECIFIC DESCRIPTION

Figure 1:
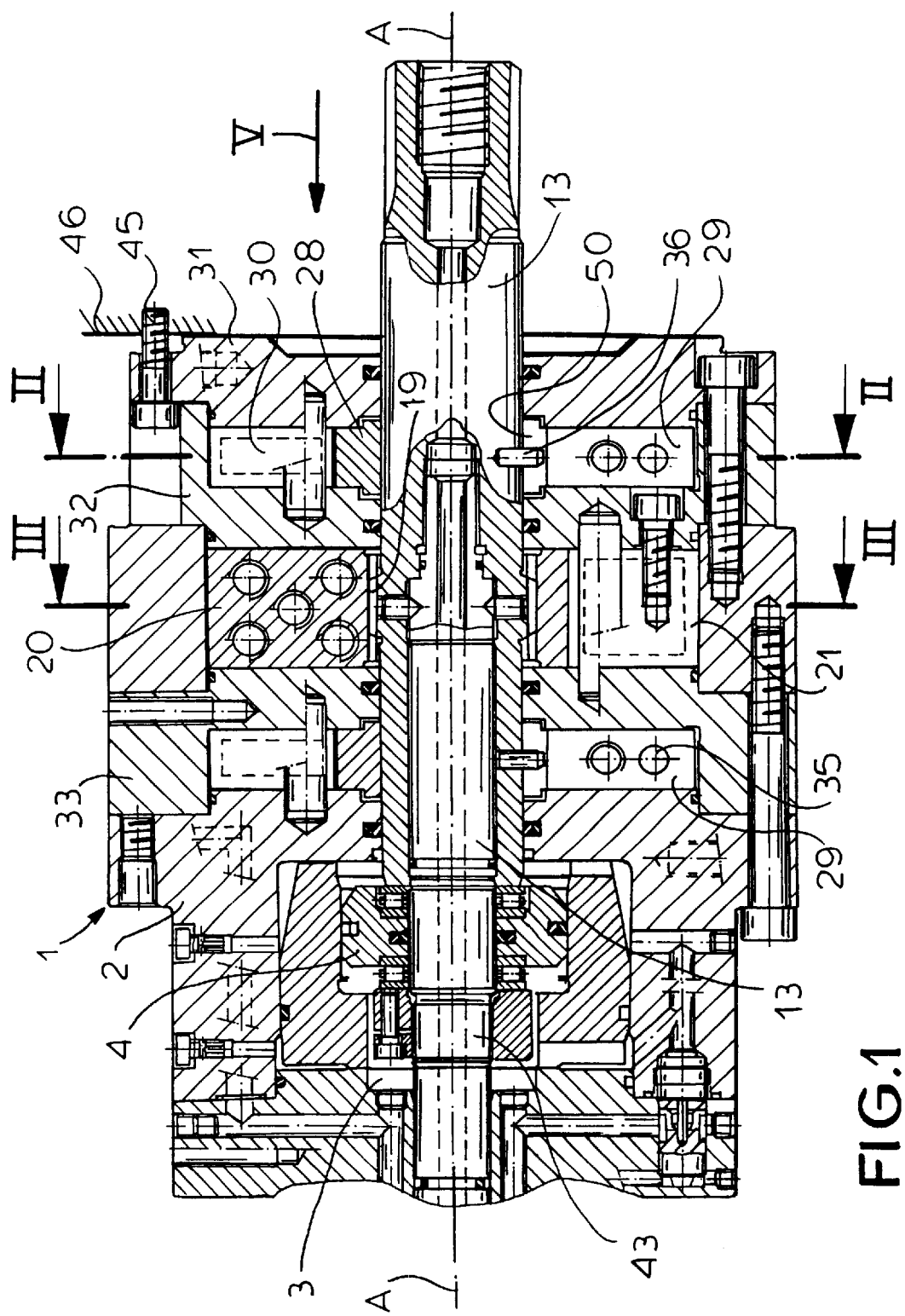
FIG. 1 is an axial section through an outer portion of the chuck actuator according to the invention.
Figure 1A:
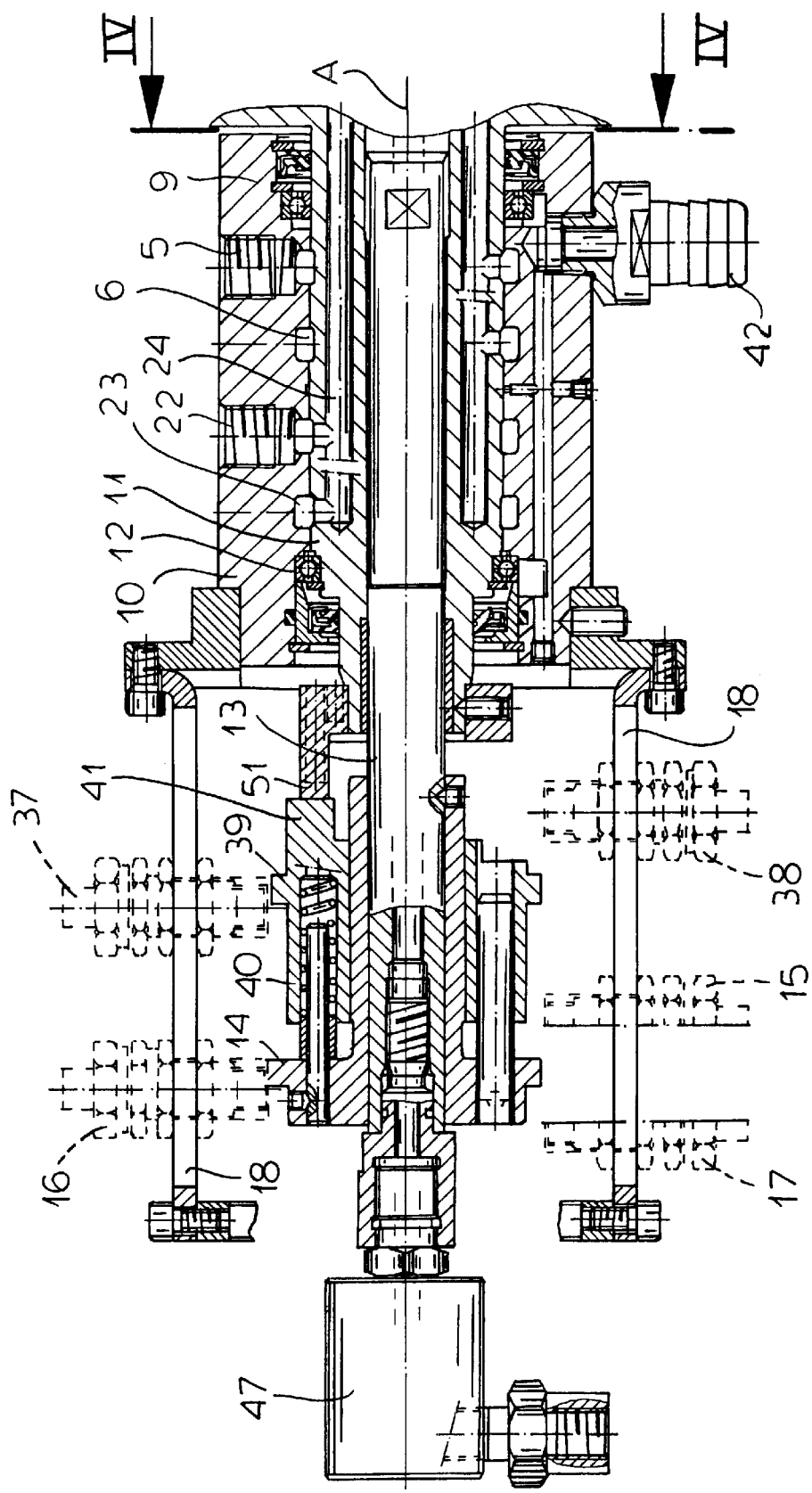
FIG. 1a is an axial section through an inner portion of the FIG. 1 chuck actuator.

As seen in FIGS. 1 and 1a a chuck actuator 1 according to the invention has a multipart housing 2 adapted to be secured by bolts 45 to a chuck body illustrated schematically at 46. This housing 2 is in fact formed of a stack of bolted-together plates 31, 32, and 33 that allow it to be taken apart relatively easily for servicing. The housing 2 forms a cylindrical chamber 3 centered on an axis A and holding a piston 4 axially but not rotationally fixed to a shaft 13.

A tubular stem 11 extending rearward coaxially around the shaft 13 is unitarily formed with the body 2. Connections 5 and 6 on a body 10 of a distributor 9 allow fluid to be applied via passages 7 and 8 in the stem 11 to opposite axial ends of the chamber 3, thereby axially displacing the piston 4 and shaft 13. Bearings 12 allow the distributor 9 to rotate freely on the stem 11.

As is standard, this shaft 13 is connected to the unillustrated jaws of the schematically illustrated chuck 46 and is axially shifted to move them between closed positions gripping a workpiece and open positions clear of and releasing the work-piece. A collar 14 on the rear end of the shaft 13 can coact with switches 15, 16, and 17 carried via mounts 18 on the axially fixed distributor 9. When the collar 14 is juxtaposed with the switch 15 the chuck is open, when with the switch 16 it is partially closed, and when with the switch 17 it is fully closed. Thus a controller connected to these switches 15 through 17 can know the condition of the chuck being operated by the actuator 1.

A central passage 43 in the shaft 13 can be fed pressurized liquid via a swivel coupling 47. A drain 42 is provided to catch any oil leaking from between the distributor 9 and the stem 11.

Figure 3:
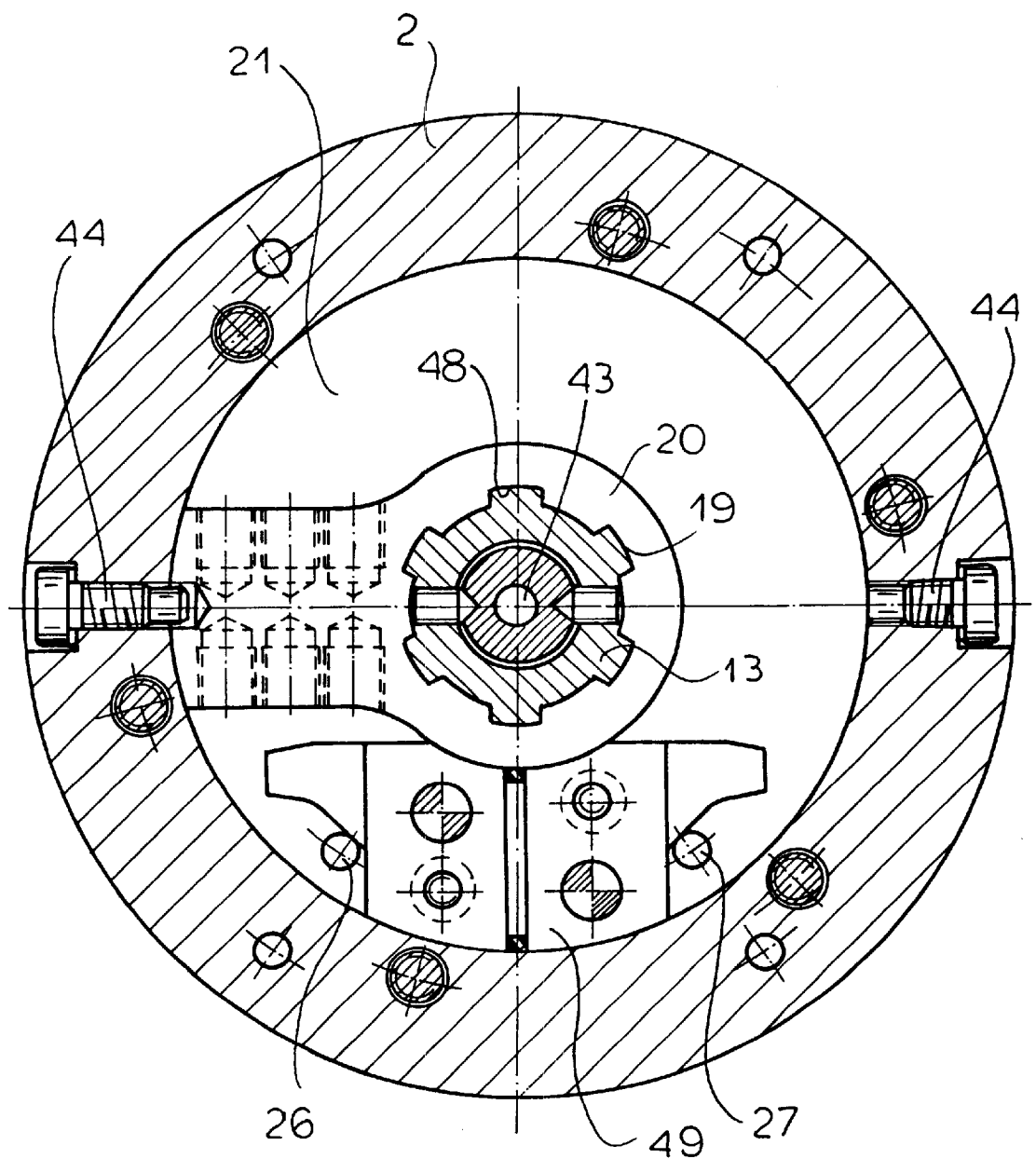
Figure 4:
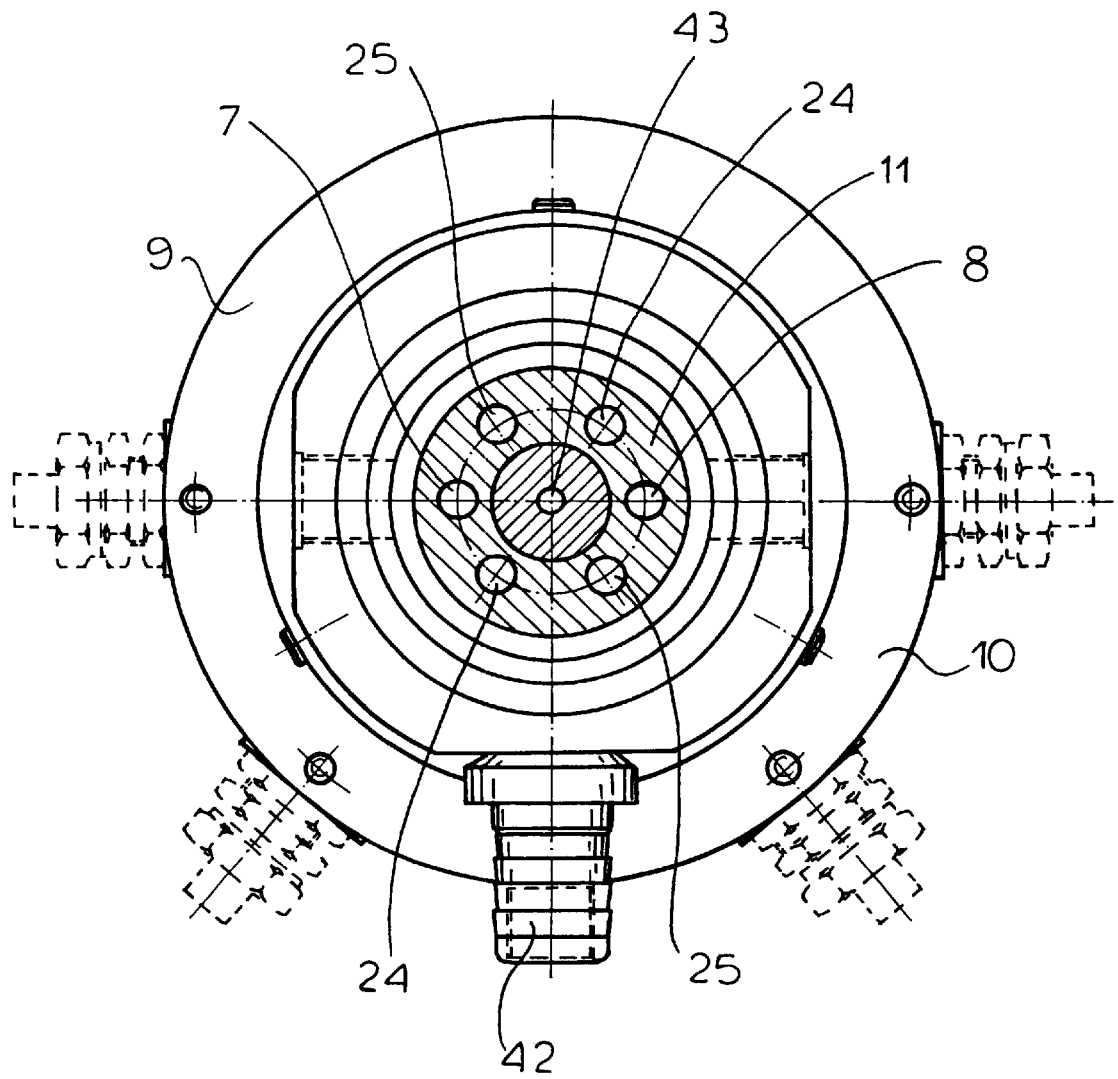
Figure 5:
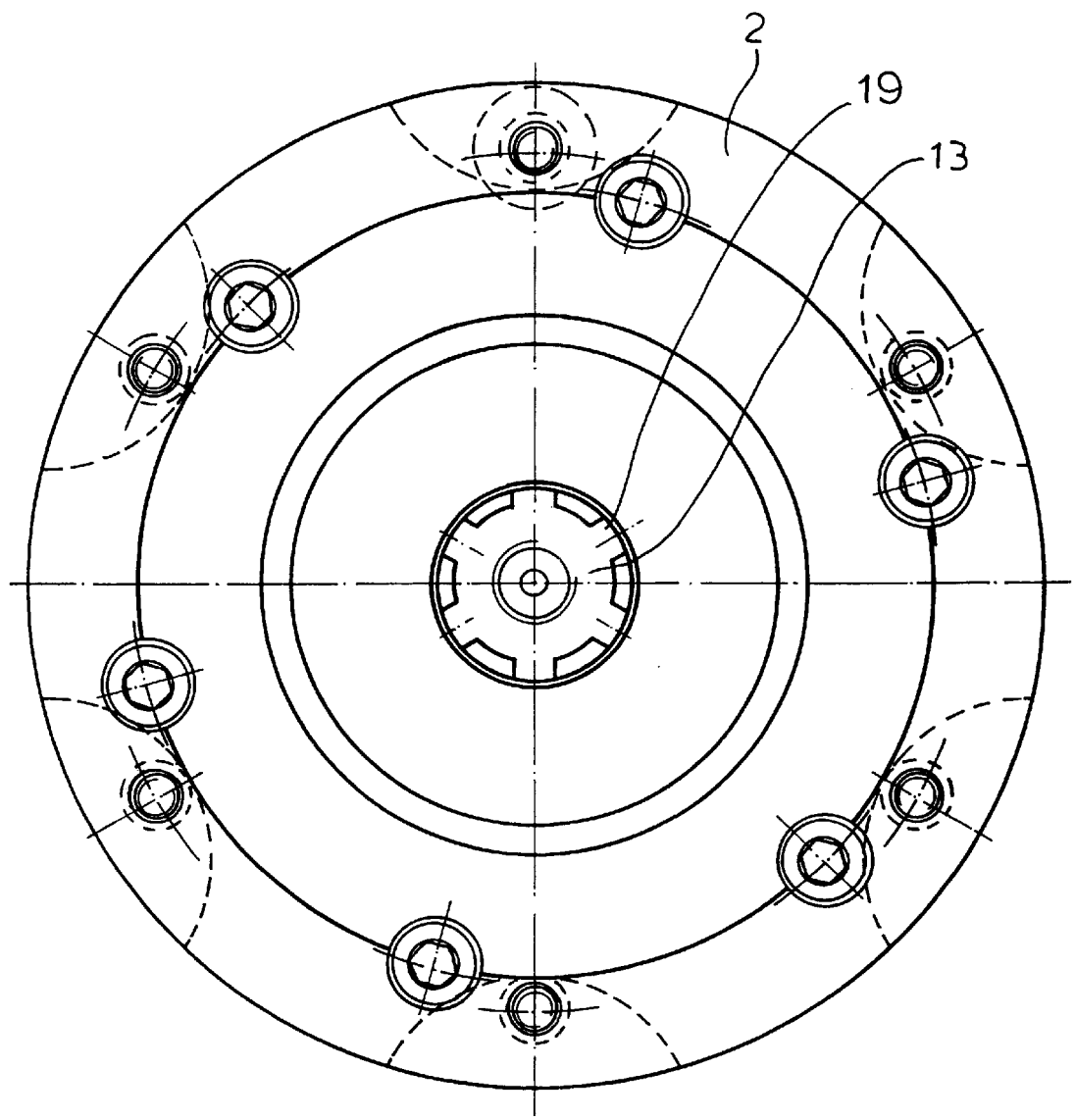
FIG. 5 is an end view taken in the direction of arrow V of FIG. 1.

According to the invention the shaft 13 is provided with axially extending splines 19 that ride in complementary grooves 48 of a vane element or switching body 20 that can move angularly in a compartment 21 formed to either side of a body 49 fixed in the housing 2. Connectors 22 and 23 on the distributor 9 feed into passages 24 and 25 in the stem 11 that in turn open at 26 and 27 (FIG. 3) at opposite ends of the chamber 21 to opposite sides of the body 20. Thus the body 20 is rotationally coupled to the shaft 13 by the interfitting formations 19 and 48, but the shaft 13 can move axially relative to it. Pressurization of either side of the chamber 20 will pivot the body 20 and, with it, the shaft 13 to move chuck jaws in the manner of a standard pivot chuck. If desired a screw 44 (left in FIG. 3) can lock the body 20 in an end position.

The angular position of the shaft 13 can be read by switches 37 and 38 coacting with a bump or ridge 39 on a sleeve 41 that is rotationally coupled to the shaft 13 but axially displaceable thereon. A spring 40 presses the sleeve 41 against a bump 51 of the stem 11 so that when the shaft 13 is rotated through 180° from the FIG. 1a position the sleeve 41 shifts axially outward to align the ridge 39 with the other switch 38. Thus these switches 37 and 38 can read out the angular position of the shaft 13 to an unillustrated controller.

Figure 2:
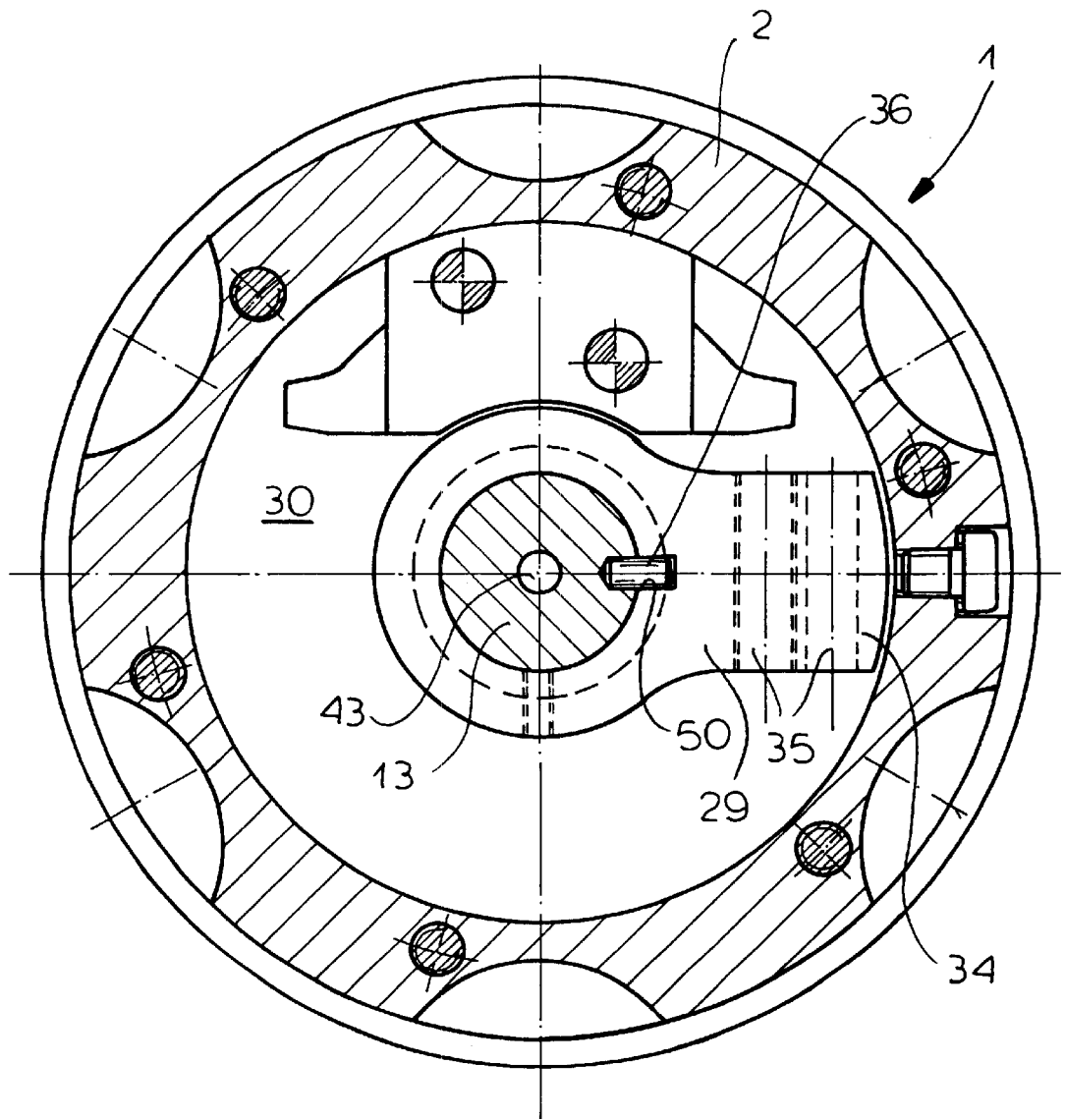
FIGS. 2 and 3 are cross sections taken along respective lines II—II and III—III of FIG. 1.

In accordance with the invention the shaft 13 is provided with a pair of counterweights 28 axially flanking the vane element 20 and each having a radially projecting arm 29 received in a respective oil-filled chamber 30 of the actuator body 2. As shown in FIG. 2 the weights 28 are formed with axially extending and radially inwardly open grooves 50 in which are received radially outwardly projecting pins 36 fixed in the shaft 13 that therefore rotationally couple the shaft 13 to the weights 28 but allow the shaft 13 to move axially relative to these weights 28. The arms 29 have outer ends 34 that closely conform to the interior of their chambers 30 and are formed with angularly throughgoing holes 35 so oil can move through them, for a damped effect.

Thus the two counterweights 28 flanking the vane element 20 will always perfectly counterbalance the body 20, no matter what angular position it is in. Since these counterweights 28 are of identical shape and mass, they allow the actuator 1 to be rotated at up to 4000 rev/min, which is twice the speed of a standard pivot-chuck actuator.

I claim:

1. A pivot-chuck actuator comprising:

a housing extending along an axis and formed centered on the axis with a piston chamber and a vane chamber offset and separate from the piston chamber;

a piston axially displaceable in the piston chamber;

a shaft axially fixed to the piston and extending from the housing on the axis;

a vane element on the shaft and angularly subdividing the vane chamber into a pair of angularly offset compartments;

formations rotationally coupling the vane element to the shaft for joint rotation therewith while permitting relatively axial movement of the vane element and shaft;

means for alternately pressurizing the compartments and thereby rotating the vane element and shaft about the axis; and a pair of counterweights angularly fixed on the shaft and axially flanking the vane element.

2. The pivot-chuck actuator defined in claim 1, further comprising formations rotationally coupling the counterweights to the shaft for joint rotation therewith while permitting relative axial movement of the counterweights and shaft.

3. The pivot-chuck actuator defined in claim 2 wherein the housing is further formed with respective counterweight chambers axially flanking the vane chamber and receiving the counterweights.

4. The pivot-chuck actuator defined in claim 3 wherein the counterweight chambers are filled with oil.

5. The pivot-chuck actuator defined in claim 4 wherein the counterweights are formed with angularly throughgoing passages.

6. The pivot-chuck actuator defined in claim 3 wherein each of the counterweights is formed as an arm projecting radially from the shaft.

7. The pivot-chuck actuator defined in claim 3 wherein the counterweights are of identical shape and mass.

8. The pivot-chuck actuator defined in claim 3 wherein the formations rotationally coupling the counterweights to the shaft are respective pins set in the shaft and axially extending grooves receiving the pins and formed in the counterweights.

9. The pivot-chuck actuator defined in claim 3 wherein the counterweights project 180° offset from the vane element.

10. The pivot-chuck actuator defined in claim 1 wherein the housing is formed by a plurality of axially stacked plates.

11. The pivot-chuck actuator defined in claim 1 wherein the housing is formed with a tubular stem coaxially surrounding the shaft, the pressurizing means including a distributor rotatable on the stem and passages formed in the stem.

* * * * *